(12) United States Patent
Kalavade

(10) Patent No.: US 7,634,281 B2
(45) Date of Patent: *Dec. 15, 2009

(54) MOBILE SERVICES CONTROL PLATFORM PROVIDING A MESSAGE FORWARDING SERVICE

(75) Inventor: Asawaree Kalavade, Stow, MA (US)

(73) Assignee: Tatara Systems, Inc., Acton, MA (US)

( * ) Notice: Subject to any disclaimer, the term of this patent is extended or adjusted under 35 U.S.C. 154(b) by 442 days.

This patent is subject to a terminal disclaimer.

(21) Appl. No.: 11/676,115

(22) Filed: Feb. 16, 2007

(65) Prior Publication Data

US 2007/0142052 A1    Jun. 21, 2007

Related U.S. Application Data

(63) Continuation of application No. 11/157,498, filed on Jun. 21, 2005, now Pat. No. 7,181,217.

(51) Int. Cl.
*H04W 4/00* (2006.01)

(52) U.S. Cl. ............. 455/466; 455/412.2; 455/414.2

(58) Field of Classification Search ........... 455/466, 455/435.2, 412.1–412.4, 433, 448, 445, 456.1–456.6, 455/457, 461
See application file for complete search history.

(56) References Cited

U.S. PATENT DOCUMENTS

| | | | | |
|---|---|---|---|---|
| 5,347,272 | A * | 9/1994 | Ota | 370/392 |
| 6,487,602 | B1 * | 11/2002 | Thakker | 709/230 |
| 6,801,781 | B1 * | 10/2004 | Provost et al. | 455/466 |
| 6,904,029 | B2 | 6/2005 | Fors et al. | |
| 6,912,389 | B2 | 6/2005 | Bright et al. | |
| 2002/0137459 | A1 * | 9/2002 | Ebata et al. | 455/16 |
| 2005/0002407 | A1 | 1/2005 | Shaheen et al. | |
| 2005/0202819 | A1 | 9/2005 | Blicker | |

OTHER PUBLICATIONS

3GPP TS 23.234 V6.0.0, Technical Specification Group Services and System Aspects; 3GPP system to Wireless Local Area Network (WLAN) interworking system description, Mar. 2004.
3GPP TS 23.008 v7.0.0, Technical Specification Group Core Network and Terminals: Organization of subscriber data, Dec. 2005.

* cited by examiner

*Primary Examiner*—Kent Chang
*Assistant Examiner*—San Htun
(74) *Attorney, Agent, or Firm*—Fulbright & Jaworski L.L.P.

(57) ABSTRACT

A mobile services control platform supports enhanced services for SMS or MMS message forwarding. The service allows a subscriber to receive SMS directed to his mobile number across a range of devices, depending on the context, device, and the network the user is connected from. In a representative example, when the user connects over a Wi-Fi network, he selects "Wi-Fi SMS" option from a client. As a result, future SMS sent to the user's mobile number get routed to his laptop over Wi-Fi. Similarly, SMS messages sent by the user from his laptop Wi-Fi client are delivered to the recipient's mobile device as if they originated from the mobile phone. When Wi-Fi SMS is activated, preferably voice calls continue to be received over the mobile phone. When the user disconnects from the Wi-Fi network, SMS messages are routed back over to the mobile phone.

1 Claim, 12 Drawing Sheets

MOBILE SERVICES CONTROL PLATFORM PROVIDING A MESSAGE FORWARDING SERVICE

This application is based on Ser. No. 11/157,498, filed Jun. 21, 2005, which application was based on U.S. Ser. No. 60/605,612, filed Aug. 30, 2004.

BACKGROUND OF THE INVENTION

1. Technical Field

The present invention relates generally to WAN mobility technologies and services.

2. Description of the Related Art

A mobile services control platform (MSCP) enables service providers to offer a range of services on mobile computing devices, such as laptops, PDAs, and smart phones. A representative mobile services control platform is described in commonly-owned, co-pending application Ser. No. 10/871,413, titled "Wi-Fi Service Delivery Platform for Retail Service Providers," filed Jun. 18, 2004. As described in that application, the mobile services control platform enables service providers to enhance their existing wireless data offerings to include access over new networks (such as Wi-Fi) and new devices (such as laptops and PDAs), while still being part of a single subscriber profile. This enables service providers to offer to their existing subscribers a single account and single bill for all wireless services.

A representative mobile services control platform is available commercially from Tatara Systems, Inc. of Acton, Mass. This platform comprises a centrally deployed gateway server working in conjunction with a client component on a subscriber's mobile computing device. The client and server maintain a real-time, secure and bi-directional control channel that runs across any IP network. This architecture enables service providers to build their brands, maintain ownership of their customers and extend access to their IP-based services across multiple "home" and "roaming" access networks. The real-time, secure control channel allows service providers to securely authenticate customers, to collect diagnostic information in real-time from the user's device, to monitor and manage service level agreements (SLAs) with roaming partners, to support a broad range of pricing and payment options, and to deliver integrated converged mobile services.

It would be desirable to extend the functionality of a mobile services control platform to provide a message forwarding service for SMS and MMS data messages. SMS refers to Short Message Service, which is a text message service that enables short messages (e.g., generally no more than 140-160 characters in length) to be sent and transmitted from a mobile device. Another such service is MMS, the Multimedia Message Service, which extends SMS to provide for non-real-time transmission of various kinds of multimedia contents like images, audio, video clips, and the like, to MMS-capable handsets.

BRIEF SUMMARY OF THE INVENTION

A method of communicating a data message within a converged networking operating environment wherein a gateway is deployed in a service provider's telecommunications network and client software is embedded in a subscriber mobile device that is operable within both the telecommunications network and a wireless local area network to which the subscriber mobile device is connectable. The service provider's telecommunications network comprises an SMS server (typically, a set of one or more network elements such as SMS-GMSC, an SMS-IWMSC, or the like) that routes data messages, and a database (e.g., an HLR) to which a subscriber's identity is assigned. Preferably, a secure connection link is established between the client software and the gateway. The method begins by updating data message routing information in the database to identify the gateway as a location of the subscriber mobile device. In a representative embodiment, this step configures the gateway as an SGSN. Once the gateway is configured in this manner, data messages intended for the subscriber are routed seamlessly to the subscriber mobile device, and data messages originated by the subscriber are routed seamlessly from the subscriber mobile device. In one embodiment, the data message is SMS. An advantage of the present invention is that communication of the data message does not impair communication of voice signals to the subscriber mobile device over the connection.

A received SMS data message (MT SMS) is forwarded as follows. Upon receipt at a first network element (e.g., an SMS-GMSC) of an SMS data message intended for the subscriber, the first network element queries the database for the subscriber's location. The database returns to the first network element location information associated with the gateway. The SMS data message is then forwarded from the first network element to the gateway, which then forwards the SMS data message from the gateway to the client device over the secure connection. An outbound SMS data message (MO SMS) is sent from the subscriber mobile device as follows. Upon receipt at the gateway of an SMS data message originated by the subscriber, the SMS data message is forwarded from the gateway to a second network element (e.g., an SMS-IWMSC) for subsequent delivery over the service provider's telecommunications network. The second network element forwards the outbound SMS data message. Upon receiving a delivery report at the second network element, the delivery report is forwarded from the second network element to the gateway, which then delivers the report over the connection to the subscriber's mobile device.

The present invention is not limited to SMS. Another data service that may be implemented by the gateway is MMS forwarding, both in-bound and out-bound. For the in-bound case (MT MMS), upon receipt at a relay server of an MMS data message intended for the subscriber, the relay server notifies the service provider's SMS server. The SMS server then performs the SMS message delivery function described above, with the SMS message including a notification to the subscriber that the subscriber has an MMS data message waiting. The subscriber then retrieves the MMS data message either directly from the relay server, or indirectly, i.e., using the gateway as an intermediary. Preferably, the subscriber client uses the gateway to deliver its outbound MMS (MO MMS) in the manner described above with respect to the SMS embodiment.

More generally, the present invention provides SMS and/or MMS forwarding to any Internet Protocol (IP)-based network (and not just Wi-Fi) irrespective of the underlying network architecture, protocols or systems. Thus, the present invention may be implemented to provide the message forwarding functionality from a GSM network to a Wi-Fi network, from a CDMA network to a Wi-Max network, or, more generally, from a first voice-based telecommunications network to a second, IP-based network.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

As noted above, the present invention may be implemented in a converged networking environment wherein a gateway is deployed in a service provider's telecommunications network and client software is embedded in a subscriber mobile device that is operable within both the telecommunications network and a wireless local area network to which the subscriber mobile device is connectable. As noted above, the present invention is not limited for use with any particular voice telecommunications network, protocol or technology. For illustrative purposes only, the following describes the invention in the context of a GSM network as a representative service provider's networking environment. The invention may likewise be implemented in a CDMA networking environment, or in or across other known or later-developed environments in which SMS and/or MMS message forwarding is desired. Moreover, while one embodiment of the present invention is illustrated in the context of providing message forwarding over Wi-Fi, this is not a limitation of the invention either, as the functionality may be implemented to provide SMS and/or MMS forwarding to any IP-based network.

Figure 1:
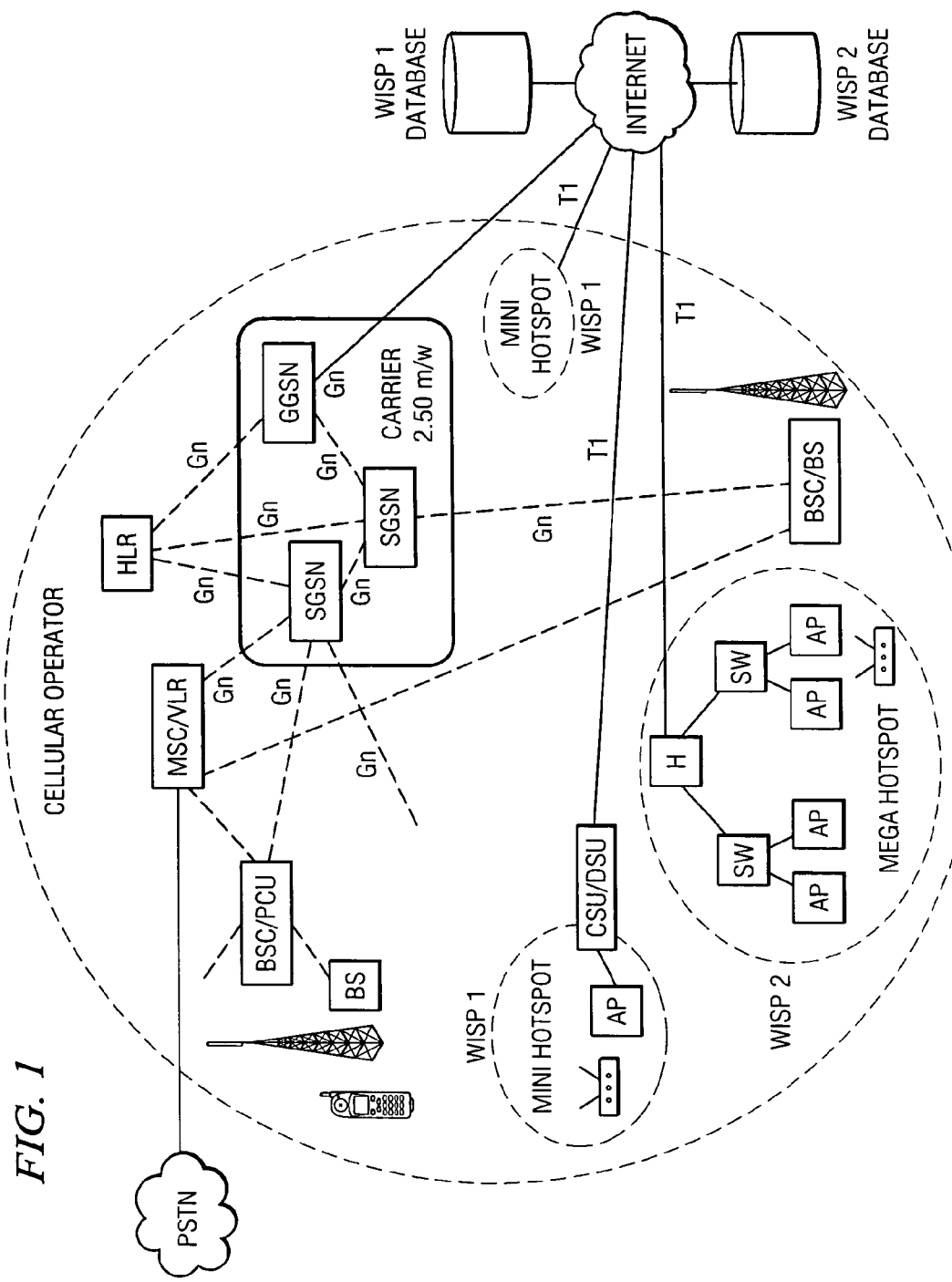
FIG. 1 is a simplified block diagram of a converged networking operating environment comprising a service provider's telecommunications network and a wireless local area network to which a subscriber mobile device is connectable.

As is well-known, a network 10 (such as a GSM network) comprises a number of basic components such as illustrated in FIG. 1. They include a mobile switching center (MSC) 12, which is an enhanced ISDN switch that is responsible for call handling of mobile subscribers. A visitor location register (VLR) 14 is an intelligent database that stores on a temporary basis data required to handle calls set up or received by mobile stations 16 registered with the VLR. The VLR also controls certain services associated with outgoing calls. The MSC and VLR may be separate entities or implemented as a single unit. The home location register (HLR) 18 is an intelligent database, which is responsible for management of each subscriber's records. The HLR also controls certain services associated with incoming calls. Each mobile station 16 is the physical equipment used by a subscriber. The mobile station includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). More generally, a mobile station is a wireless client device having a dual mode interface, namely, a WLAN interface and a WAN interface. The WLAN interface provides Wi-Fi support, Wi-Max support or, more generally, connectivity to an IP-based network. The WAN interface provides GSM support, CDMA support, or the like, depending on the underlying telecommunication network and protocol. Representative wireless client devices include, without limitation, a laptop, a cell phone, or a PDA with a GPRS NIC. Mobile stations connect to a base station (BS) 28, which provides radio coverage within a cell. Multiple base stations 28 connect into base station controller (BSC) 30, which is a small switch that acts as a local concentrator of traffic and provides local switching to effect handover between base stations. Voice traffic is sent from the BSC 30 to the mobile station. A packet control unit (PCU) 32 installed at the BSC 30 separates data traffic coming from a mobile station. The data traffic is managed by the operator's wireless data network. In particular, the data traffic goes to a Serving GPRS Service Node (SGSN) 34. A carrier's network typically has multiple SGSNs. The SGSNs authenticate mobile users by querying an HLR 18. The SGSN 34 is also responsible for managing traffic, and it routes data traffic over the carrier's GPRS network to a Gateway GPRS Service Node (GGSN) 36. The GGSN 36 is a border router that routes traffic to and from the GPRS network into the public Internet. As a user moves across cells, the user becomes associated with different SGSNs. The SGSNs are responsible for managing the mobility of the user.

The network architecture for a wireless local area network 38 is also illustrated in FIG. 1. A typical wireless LAN is deployed as a "hotspot" where mobile device users are expected to frequent such as, e.g., at an airport, a convention center, a local retail shop, and the like. Hotspots are often classified into two general categories: mini hotspots and mega hotspots. A mini hotspot is a relatively small deployment such as, e.g., in a retail shop. A mini hotspot deployment typically comprises a single wireless LAN 802.11 based access point (AP) 40 and provides connectivity into the Internet typically over a DSL, T1, or a leased line. A mega hotspot is a deployment that supports a set of access points and covers a moderate sized area such as, e.g., a convention center. Such a deployment typically has multiple APs connected through Ethernet switches and a router to the public Internet typically over a T1 or a leased line. The hotspots are typically managed and operated by wireless ISP's (WISP) or wireless system integrators. Users with laptops or PDA's with 802.11 based network interface cards (NIC's) use the 802.11 wireless network to access the Internet.

Figure 2:
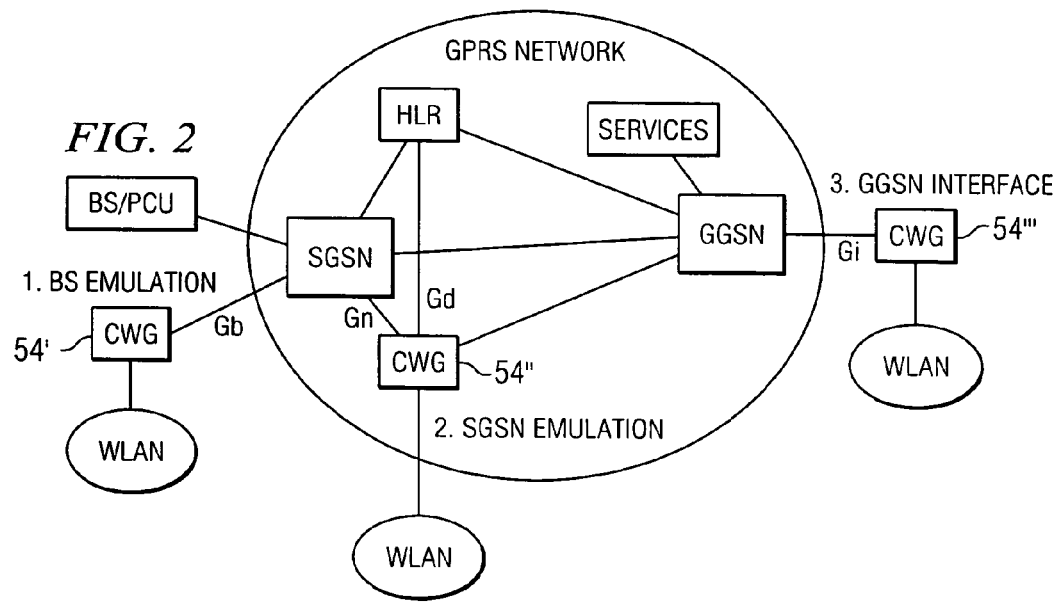
FIG. 2 illustrates various ways in which the gateway and its corresponding client component may be implemented to provide a converged networking operating environment.

FIG. 2 illustrates a converged networking environment that integrates a WLAN 50 and a WAN 52 as described in commonly-owned, co-pending application Ser. No. 10/213,329. The present invention may be implemented in this environment. In these embodiments, convergence is achieved using a CWG 54 and a CWG client 56. The CWG 54 is a gateway between the wireless LAN 50 and the GPRS network 52. The CWG 54 can be deployed in multiple ways by emulating different interfaces within the GPRS network 52. A CWG 54' can be deployed, e.g., by emulating a base station/packet control unit (BS/PCU) and connecting to the SGSN 19 within the GPRS network. In this way, the CWG 54' makes a wireless LAN hotspot look like a GPRS cell to the SGSN. To accomplish this, the CWG emulates several functions within the mobile station, the BS, and the PCU. By masquerading as a GPRS cell, this design enables the wireless LAN cell to leverage several key features and functionalities within the GPRS network. In particular, the WLAN leverages the authentication and mobility management capabilities of the SGSN. Alternatively, a CWG 54" can be deployed by emulating a SGSN and by connecting to the GGSN 22 and other SGSNs 18 in the GPRS network. From the GPRS network perspective, the CWG 54" looks like a SGSN, while from the LAN side, the CWG looks like a LAN interface. In this approach, the CWG emulates the SGSN and leverages the mobility management infrastructure of the GPRS network. As a further alternative, a CWG 54" is deployed as a GGSN interface. In this approach, the CWG connects to the GGSN 22 from the external side, as against the GPRS network side. In this case, the CWG is a gateway that connects to the GGSN and leverages authentication infrastructure within the GPRS network.

A CWG client 56 is installed on the mobile station. The client software can include information downloaded by the operator when the user first subscribes to hotspot access. The client is responsible for conveying identification information as well as for assisting in traffic and mobility management. As described in Ser. No. 10/213,329, the client software is generally needed to provide session and traffic integration and is optional if only AAA integration is desired. If present, however, the client software communicates with the CWG to authenticate the user with the GPRS network.

The CWG gateway and client comprise a mobile services control platform. The gateway preferably is disposed within a mobile operator's backend network working in conjunction with a client component on the subscriber's mobile computing device. The client and server components maintain a real-time, secure and bi-directional communications channel that runs across any IP network. This architecture enables service providers to build their brands, maintain ownership of their customers, and to extend access to their IP-based services across multiple "home" and "roaming" Wi-Fi access networks. Representative gateway and client components are available from Tatara Systems, Inc. of Acton, Mass.

Figure 3:
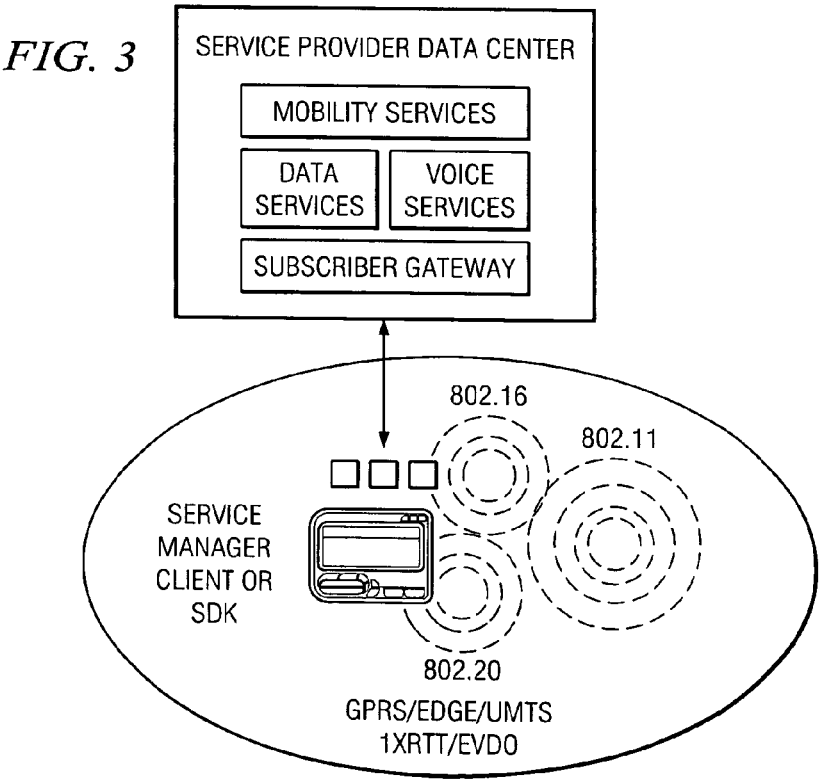
FIG. 3 illustrates a mobile services control platform that provides data mobility services of the present invention.

As noted below and illustrated in FIG. 3, the gateway 60 and its corresponding client component 62 enable access over multiple networks. Specific capabilities include authentication and billing support, enhanced security, real-time customer care and diagnostics, business analytics, client and location management, as well as roaming partner administration, auditing and network management. Additional details regarding these components are provided in commonly-owned co-pending application Ser. No. 10/871,413. According to the present invention, an additional data message forwarding service, namely, SMS or MMS forwarding, is deployed using the platform. One or both of these functions may be offered as part of a data "mobility service" as shown in FIG. 3.

The following sections provide details on the SMS forwarding functionality, which is sometimes referred to herein as SMS Forwarding or SMS over IP. Specific software architecture functions are covered in the section below titled Additional Implementation Details.

The SMS Forwarding application may be implemented in a number of ways. Preferably, the SMS over IP service leverages existing core infrastructure and does not impact other applications (such as voice).

(1) GPRS approach. In this method, the gateway leverages the GPRS core to route SMS to the Wi-Fi (or equivalent) device. Specifically, when SMS over IP (however designated) is selected, the gateway operates as a SGSN, updates SMS location for this user in the HLR to point to the gateway, the SMSC routes SMS to the gateway over the GPRS core network, and the gateway sends the SMS over the Wi-Fi bearer. Details are described in the next section. Note that in this approach, when the user does not want Wi-Fi SMS, the GSM network is used to route SMS to the mobile phone. Note also that voice traffic remains unaffected and continues to be routed to the mobile device even when SMS messages are sent to the Wi-Fi device. As noted above, the GPRS approach also extends to a CDMA approach, where similar messages can be used to route the SMS data.

(2) MultiSIM approach: In this approach, multiSIM provisioning is leveraged to provision service over Wi-Fi, and the gateway is used to manage the SIM profile for Wi-Fi connections and to route SMS to/from the Wi-Fi device.

(3) Other approaches: As core networks evolve to IMS, the SMS can be delivered to Wi-Fi over IMS. Also, as being discussed in the 3GPP/WLAN standard, the HSS may be upgraded to include a Wi-Fi routing entry so that the GSM/GPRS routing entries do not need to be overloaded.

1. GPRS Approach

This embodiment leverages the GPRS based SMS delivery support within the GPRS core network to deliver SMS over IP (such as Wi-Fi). In one illustrated embodiment as now described, the gateway functions as an SGSN and enables SMS messages to be routed to a Wi-Fi network (or, more generally, any IP-based network).

Figure 4:
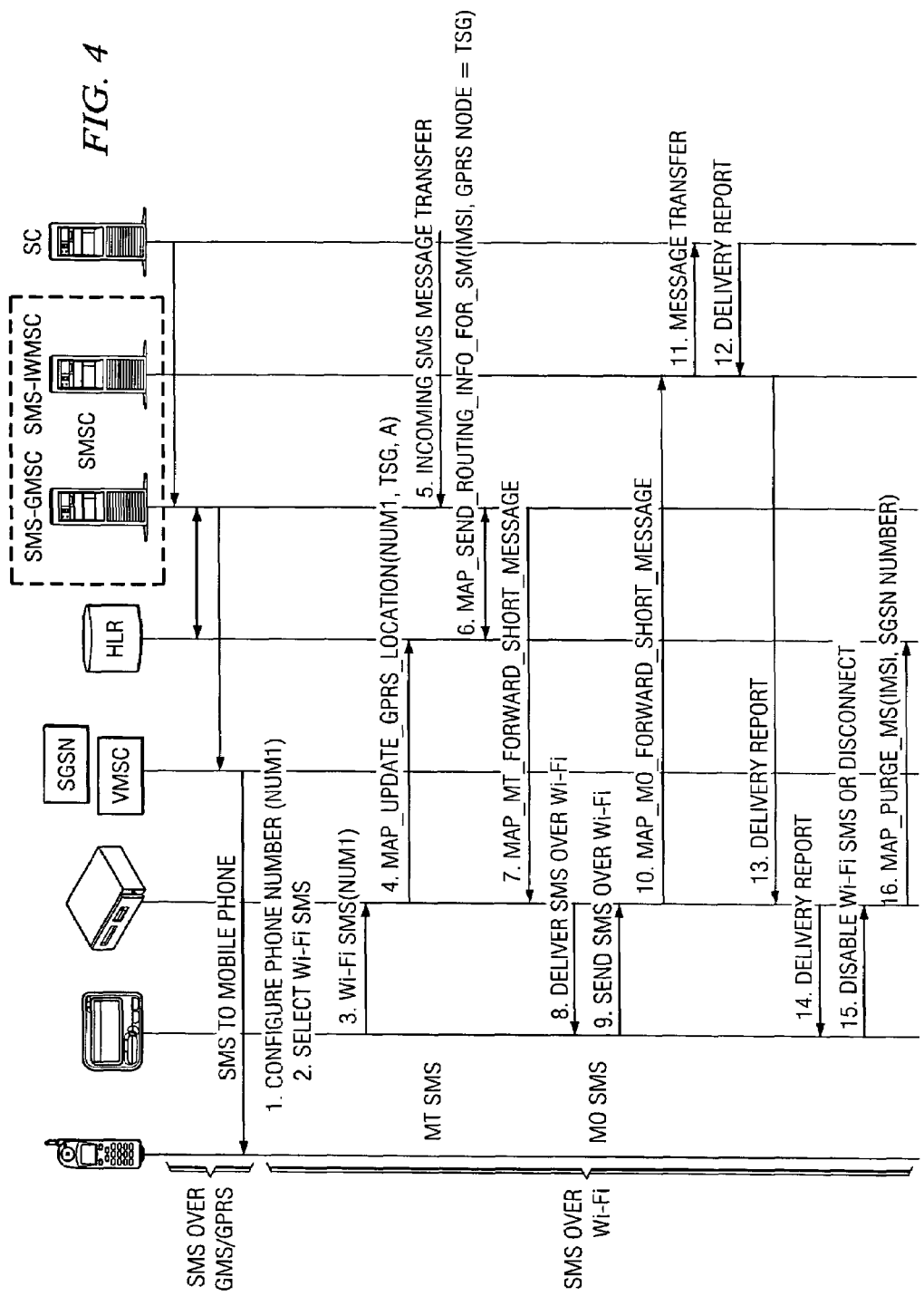
FIG. 4 illustrates a preferred call flow for a first embodiment of the invention using a GPRS approach for the SMS Forwarding service.
Figure 5:
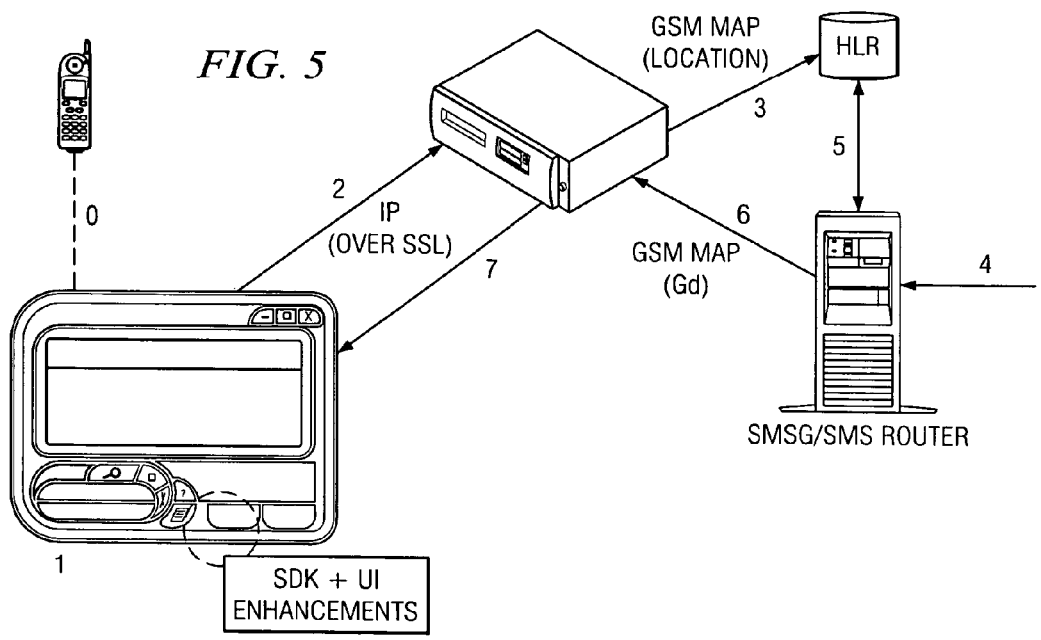
FIG. 5 further illustrates the call flow shown in FIG. 4.

A representative call flow diagram is shown in FIG. 4 and described below; FIG. 5 illustrates the call flow at a high level. In these examples the underlying telecommunications network is GSM based, but this is not a limitation of the invention as has been previously mentioned. The functionality may be implemented in a CDMA operating environment as well.

Before the SMS forwarding service is enabled, SMS messages get routed to the mobile phone over GSM (or GPRS) as shown in the top part of FIG. 1. The SMS arrives at the SMS-GMSC, which in turn queries the HLR for SMS routing information. The HLR returns the Visited MSC (or SGSN) address associated with the mobile device. The GMSC forwards the SMS to the VMSC (or SGSN) over an A (or Gd) interface, which in turn sends the SMS out to the mobile device. Most networks today use the VMSC to deliver SMS over GSM.

In an illustrative embodiment, the steps for implementing SMS Forwarding are summarized below:

1. The user's client is configured with the mobile number (see step 0 in FIG. 5).
2. The user selects "Wi-Fi SMS" (this designation being merely illustrative) option from the client (see step 1 in FIG. 5). Alternatively, the Wi-Fi SMS selection can be tied to certain SSIDs as well, for instance, always enabled when connected from a campus network. This policy can be configured through a combination of user and service provider defined preferences.
3. The client sends the "Wi-Fi SMS" message to the Subscriber Gateway, preferably over a secure link (see step 2 in FIG. 5).
4. The Subscriber Gateway updates the SMS routing information in the HLR by using a MAP Update GPRS Location message to point the SGSN address in the HLR to the Subscriber Gateway (see step 3 in FIG. 5). In this case, the Subscriber Gateway functions as a SGSN. Note that since the GPRS location is updated, voice call routing remains unaffected.

TABLE 1

MAP_UPDATE_GPRS_LOCATION

| Parameter name | Request | Indication | Response | Confirm |
|---|---|---|---|---|
| Invoke Id | M | M(=) | M(=) | M(=) |
| IMSI | M | M(=) | | |
| SGSN number | M | M(=) | | |
| SGSN address | M | M(=) | | |
| Supported CAMEL Phases | C | C(=) | | |
| SoLSA Support Indicator | C | C(=) | | |
| Super-Charger Supported in Serving Network Entity | C | C(=) | | |
| GPRS enhancements support indicator | C | C(=) | | |
| Supported LCS Capability Sets | C | C(=) | | |
| Offered CAMEL 4 CSIs | C | C(=) | | |
| Inform Previous Network Entity | C | C(=) | | |
| PS LCS Not Supported by UE | C | C(=) | | |
| HLR number | | | C | C(=) |
| User error | | | C | C(=) |
| Provider error | | | | O |

5. An incoming SMS arrives at the SMS-GMSC (see step 4 in FIG. 5).
6. The SMS-GMSC queries the HLR for SMS routing information by using the MAP message MAP Send Routing Info for SM (see step 6 in FIG. 5). This HLR returns the updated SGSN address as the network node number. This is now the address of the Subscriber Gateway. The specific message and the related information are shown below. The GPRS Node indicator parameter indicates that the Network Node Number sent by the HLR is the SGSN number. The GPRS Support Indicator parameter indicates that the SMS-GMSC supports GPRS specific procedure of combined delivery of Short Message via MSC and/or via the SGSN.

TABLE 2

MAP-SEND-ROUTING-INFO-FOR-SM

| Parameter name | Request | Indication | Response | Confirm |
|---|---|---|---|---|
| Invoke Id | M | M(=) | M(=) | M(=) |
| MSISDN | M | M(=) | | |
| SM-RP-PRI | M | M(=) | | |
| Service Centre Address | M | M(=) | | |
| SM-RP-MTI | C | C(=) | | |
| SM-RP-SMEA | C | C(=) | | |
| GPRS Support Indicator | C | C(=) | | |
| IMSI | | | C | C(=) |
| Network Node Number | | | C | C(=) |
| LMSI | | | C | C(=) |
| GPRS Node Indicator | | | C | C(=) |
| Additional Number | | | C | C(=) |
| User error | | | C | C(=) |
| Provider error | | | | O |

Note that the only change needed from the operator side (if the HLR returns a SGSN address) is to configure the SMSC to enable delivery of SMS over GPRS. Most SMSCs support SMS delivery over GPRS. Note also that in this approach all GPRS traffic would get routed to the Wi-Fi network.

7. The SMS-GMSC then uses a MAP message MAP MT Forward Short Message to forward the SMS to the Subscriber Gateway. From an implementation perspective, all that is required is that the SMSC now send the same MAP messages for SMS delivery, but to the SGSN address. If supported, other APIs could be used between the SMSC and the Subscriber Gateway to deliver SMS over SMPP/CIMD/UCP, and the like (this depends on the particular vendor whose SMSC is deployed).

TABLE 3

MAP-MT-FORWARD-SHORT-MESSAGE

| Parameter name | Request | Indication | Response | Confirm |
|---|---|---|---|---|
| Invoke Id | M | M(=) | M(=) | M(=) |
| SM RP DA | M | M(=) | | |
| SM RP OA | M | M(=) | | |
| SM RP UI | M | M(=) | C | C(=) |
| More Messages To Send | C | C(=) | | |
| User error | | | C | C(=) |
| Provider error | | | | O |

The SM RP DA is the IMSI, SM RP OA is the address of the message center, and SM RP UI is the message transfer protocol data unit.

Figure 15:
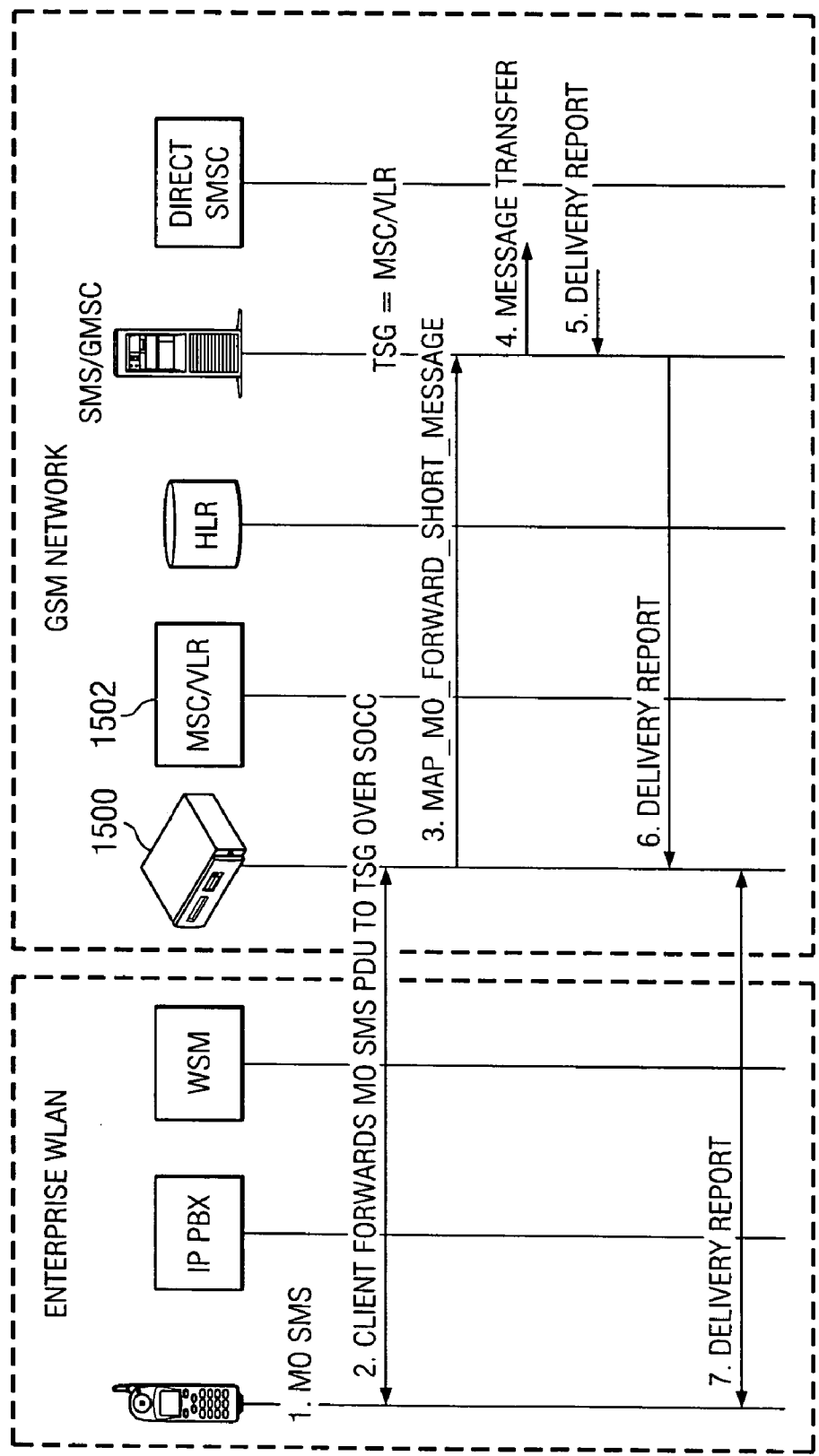
FIG. 15 is a call flow diagram illustrated a call flow for MO SMS using a MSC/VLR approach according to the present invention.

8. The Subscriber Gateway then forwards the SMS over Wi-Fi to the client (see step 7 in FIG. 5). Note that GPRS bearer need not be used for SMS delivery to Wi-Fi.
9. In the case of an MO SMS, the client sends the message over Wi-Fi to the Subscriber Gateway.
10. The Subscriber Gateway uses MAP message MAP MO Forward Short Message to forward the message to the IWMSC. The relevant parameters are the same as in step 7. Alternatively, as an illustrated in FIG. 15, the Subscriber Gateway uses MAP message MAP MO Forward Short Message to forward the message to an SMS-GMSC, which then transfers the message to a direct SMSC for further routing.

TABLE 4

MAP-MO-FORWARD-SHORT-MESSAGE

| Parameter name | Request | Indication | Response | Confirm |
|---|---|---|---|---|
| Invoke Id | M | M(=) | M(=) | M(=) |
| SM RP DA | M | M(=) | | |
| SM RP OA | M | M(=) | | |
| SM RP UI | M | M(=) | C | C(=) |
| IMSI | C | C(=) | | |
| User error | | | C | C(=) |
| Provider error | | | | O |

11. Delivery confirmation messages can also be appropriately forwarded.
12. When the user de-selects Wi-Fi SMS, or when the Wi-Fi client is disconnected the client sends a disable message to the Subscriber Gateway.
13. The Subscriber Gateway sends a MAP_PURGE_MS message to the HLR to purge the entry for the subscriber so that future SMS are not delivered to the Subscriber Gateway, which is functioning as a SGSN.

TABLE 5

MAP_PURGE_MS

| Parameter name | Request | Indication | Response | Confirm |
|---|---|---|---|---|
| Invoke Id | M | M(=) | M(=) | M(=) |
| IMSI | M | M(=) | | |
| VLR number | C | C(=) | | |
| Freeze TMSI | | | C | C(=) |
| Freeze P-TMSI | | | C | C(=) |
| SGSN number | C | C(=) | | |
| User error | | | C | C(=) |
| Provider error | | | | O |

An advantage of this approach is that it leverages the existing SMS/GPRS infrastructure. As long as GPRS support is available in the SMSCs, this approach can be deployed in a straightforward way.

2. Multi-SIM Approach

Figure 6:
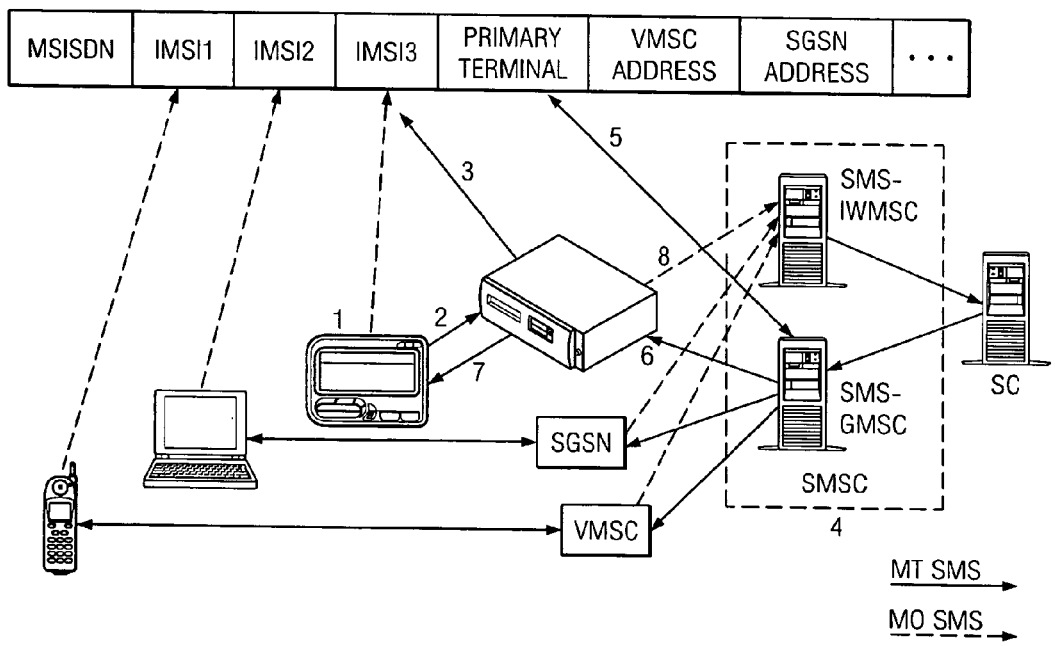
FIG. 6 illustrates an alternative embodiment using a Multi-SIM approach for the SMS Forwarding function.

This approach for SMS Forwarding takes advantage of multiSIMs, which are increasing being deployed for advanced users that want to have access to multiple devices and services under a common identity. As shown in FIG. 6, multiple SIMs are associated in the HLR/modified subscriber database. These SIMs correspond to multiple devices. Wi-Fi users are associated with a SIM as well. To enable access to services over Wi-Fi, the Subscriber Gateway updates user presence and location information for the IMSI associated with the Wi-Fi SIM (steps 2, 3). As a result, all services port to the Wi-Fi network. The actual SMS receipt and delivery steps (steps 6, 7, 8) are similar to the previous example. This approach requires support from the appropriate provisioning system. It requires the ability to configure multiple SIMs, associate priorities and policies, and duplicate messages across all devices. This approach requires synchronization across all devices as discussed below.

3. Other Approaches

In the alternative, other approaches can be used to support SMS forwarding to Wi-Fi (or any IP-based network). One approach is to emulate the MSC (instead of the SGSN) and route both voice calls and SMS to Wi-Fi. This technique may be used if the service provider chooses to route all services over Wi-Fi. Also, other approaches with advanced capabilities may be expected to be deployed in the future.

MSC Emulation: In this case, the Subscriber Gateway behaves like a VMSC to receive and forward SMS as if it were a GSM network node (the operational procedure would be similar to FIG. 1, except that the Subscriber Gateway would now support the A interface). While this would support SMS over GSM without requiring GPRS support in the SMSC, voice calls would also get routed to the Wi-Fi network. Depending on the policy, this may or may not be desirable. Yet another alternative is to couple this mechanism with the multiSIM approach and have voice call delivery be prioritized to the GSM network and SMS to Wi-Fi network.

Release 6+ network support: As networks evolve to support release 6 and the relevant 3GPP/WLAN integration interfaces, the issue of overloading the GPRS or GSM infrastructure to route information to Wi-Fi will disappear. At this stage, there would be entries in the HLR/HSS to capture WLAN specific information.

IMS based support: As IMS infrastructure is deployed, the client is able to receive IMS services over the Wi-Fi interface through the Subscriber Gateway. In this case, services such as SMS and IM can be delivered over SIP to the Wi-Fi user.

Additional Implementation Details

In this section some specifics of how the inventive SMS Forwarding capability can be implemented within representative baseline Subscriber Gateway and Service Manager client architectures. As mentioned earlier, the present invention may be implemented within components commercially available from Tatara Systems, Inc. of Acton, Mass., although this is not a limitation of the present invention.

The Subscriber Gateway should include AAA (Access related) Interfaces and SMS related Interfaces. In particular, as described in co-pending application Ser. No. 10/871,413, preferably the Subscriber Gateway interfaces to a number of components in the OSS/BSS core. These include interfaces to Subscriber Database (e.g. LDAP), AAA servers (e.g. RADIUS), HLR (e.g. MAP or ANSI 41), Billing/Mediation systems (e.g. FTP, Gd'), Network Management (e.g. SNMP), and Customer Care (e.g. HTTP). Further, preferably the gateway and the client communicate relevant messages over a secure channel (e.g. SSL). In addition to the above-mentioned Access-related Interfaces, a number of additional interfaces need to be supported to provide the SMS forward capability. They include an interface with the HLR to send additional messages to update user location data, preferably through the messages described above. The gateway also interfaces with the SMS Centers to send/receive SMS messages. Finally, the messages between the client and the gateway need to be augmented to support the SMS forward capability. These include messages to update user state and presence as well as messages to transfer message data. These message formats have been described above.

Figure 7:
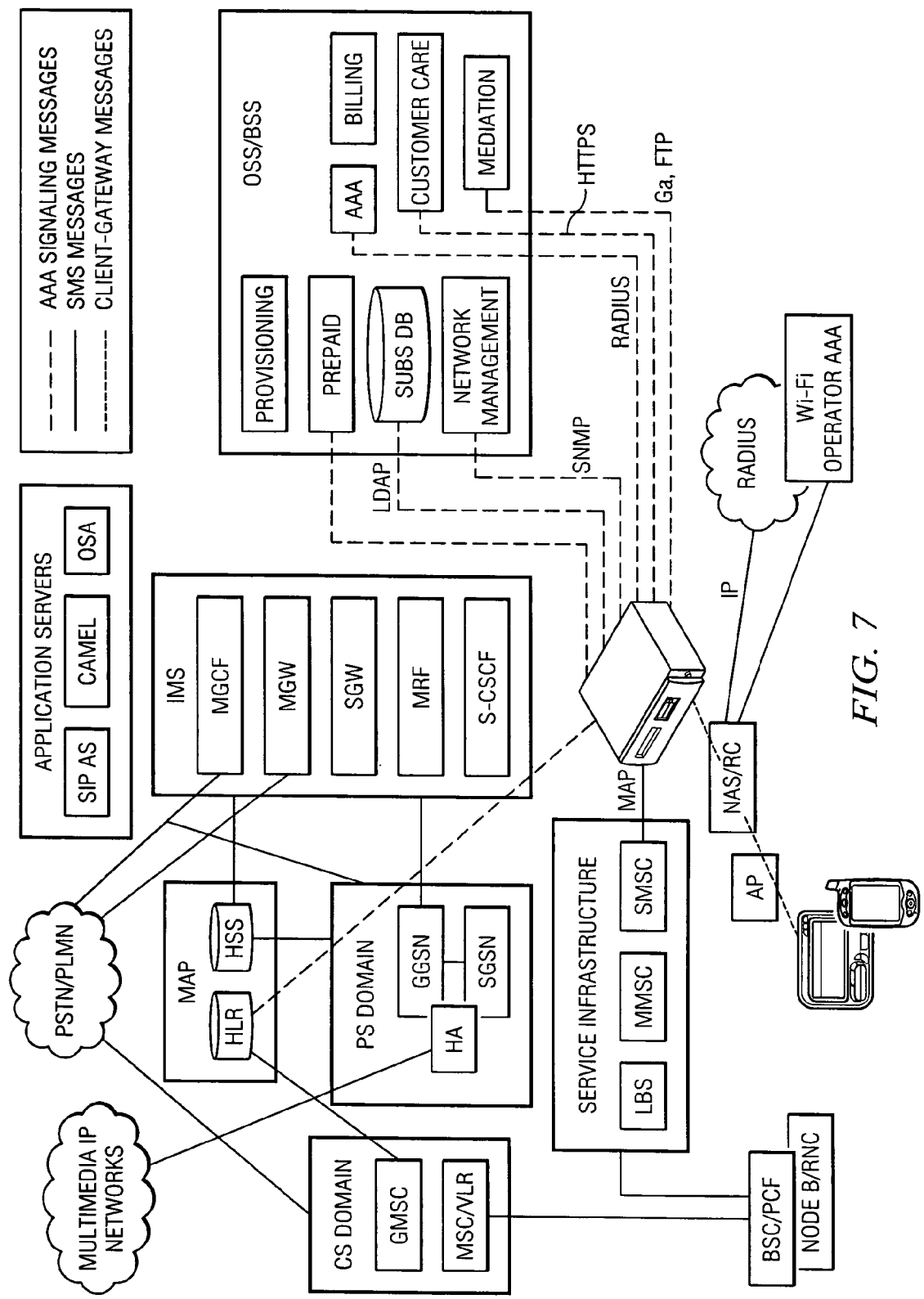
FIG. 7 illustrates a representative deployment architecture in which the present invention may be implemented.

A representative deployment architecture with the above-described interfaces is shown in FIG. 7.

Figure 8:
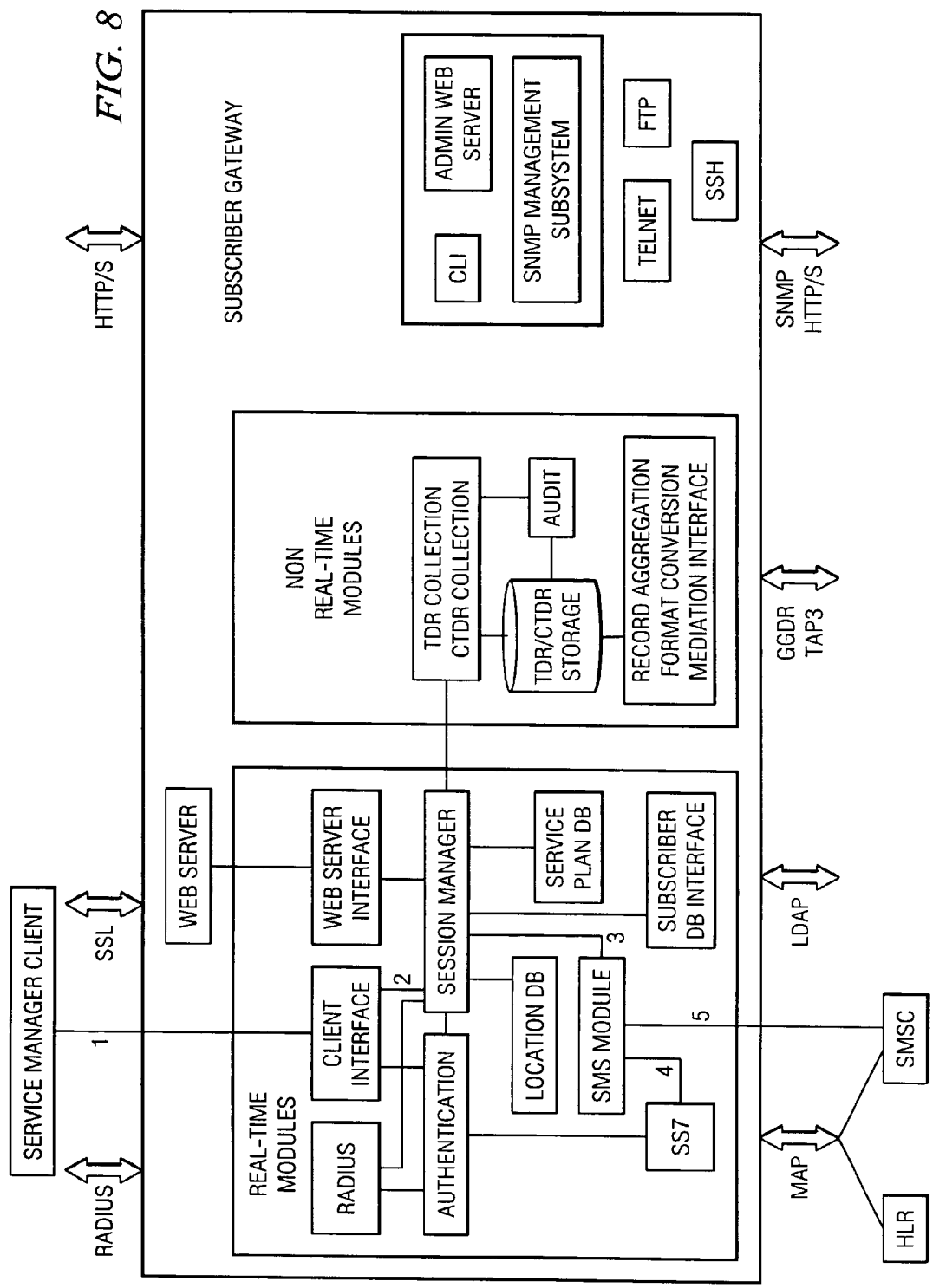
FIG. 8 illustrates a set of functional modules within a representative gateway and the specific enhancements related to the SMS Forwarding application.

FIG. 8 shows functional modules within a representative Subscriber Gateway and the specific enhancements related to the inventive SMS forwarding application. As described in co-pending application Ser. No. 10/871,413, the gateway preferably includes the following functional components:

Real-Time Modules

1. Session manager that orchestrates messages across different modules.
2. RADIUS module that interfaces with RADIUS servers and proxies within the Wi-Fi network.
3. Client module that interfaces with the clients over a secure link.

4. Web module that interfaces with a Web application for client-less authentication.
5. Authentication module that provides the authentication functionality.
6. SS7 module that sends SS7 messages to the core network.
7. Location Database that contains location data related to Wi-Fi service locations and their capabilities.
8. Subscriber Database interface that interfaces with an external subscriber database, such as LDAP.
9. Service plan database that contains information about the service plans supported for different users.

Non real-time modules include modules that collect data records, store them, audit them, and process them for delivery to other components in the service provider network. Other modules include modules for managing the gateway, such as SNMP and HTTP.

SMS Forward Related Modules

Figure 9:
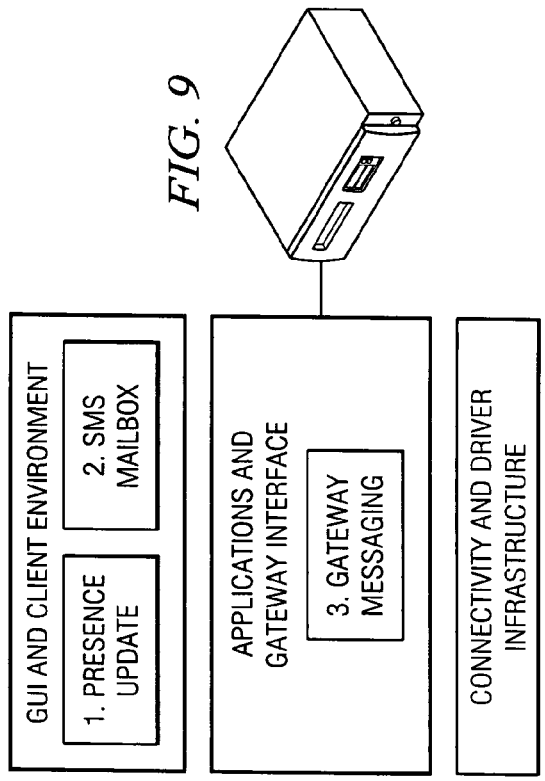
FIG. 9 illustrates a set of functional modules within a representative client and the specific enhancements related to the SMS Forwarding application.

The SMS forwarding functionality preferably is provided through a SMS module, as shown in FIG. 9. This module interacts with other modules to provide the SMS forward functionality, as is now described. In particular, a representative operation flow related to SMS forward is described in the following steps using the reference numbers in FIG. 6.

1. The client sends a message to the Gateway updating the user presence and status information, such as requesting Wi-Fi SMS.
2. The client interface forwards the message to a Session Manager.
3. The Session Manager maintains this information and sends a message to the SMS module
4. The SMS module sends a location update message to the HLR (or HSS) through the SS7 module.
5. Once location is updated, an incoming SMS message from the SMSC module using MAP messages or other standards such as SMPP. The message is then received and transcoded by the SMS module and sent through the Session Manager and the Client interface to the client. The client displays the message to the user. When the user sends an SMS, it follows a reverse path and is delivered by the SMS module to the SMSC.

Client-Related Modules

Figure 10:
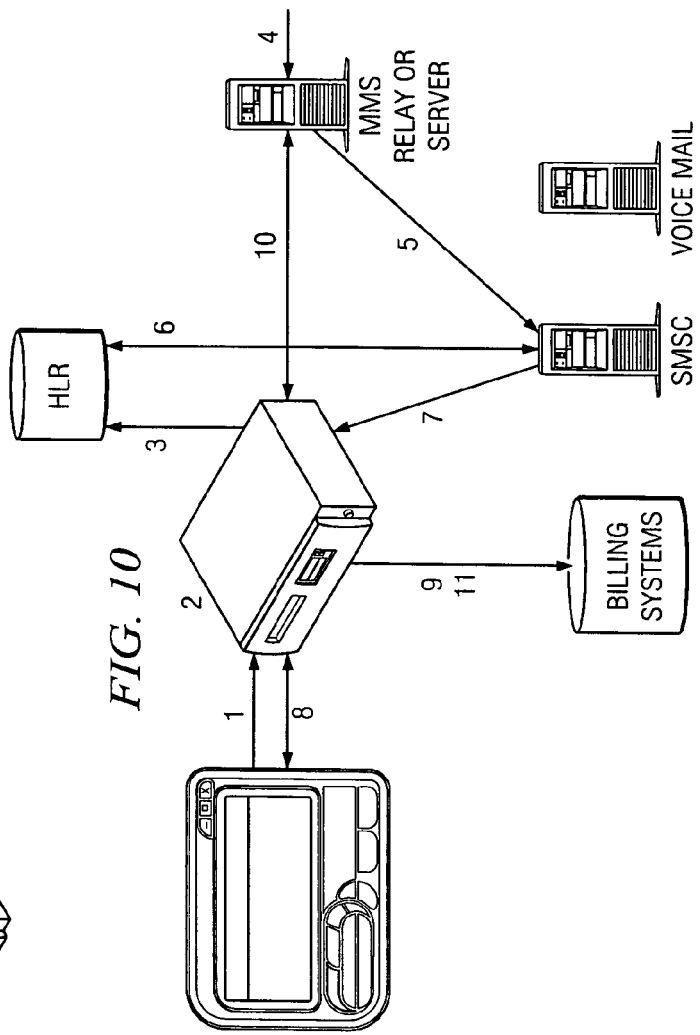
FIG. 10 illustrates a MMS Forwarding application according to another embodiment of the present invention.

The overall structure of the client and its changes to accommodate the inventive functionality is shown in FIG. 10. As illustrated, the baseline client has three major components:

1. GUI: This includes the graphical user interface capabilities related to managing the connections, status notifications, and the like.
2. Applications and Gateway interface: This component includes interfaces to other applications on the user device (e.g. VPN) as well as the secure connection into the gateway.
3. Connectivity and Driver Infrastructure: This component includes the management of the connection by interfacing with the network adaptors.

To support the SMS forward functionality, several enhancements are provided to the baseline client architecture in a representative embodiment.

1. Presence update mechanism: this component is a mechanism that allows the user to update the Wi-Fi SMS status (either enable or disable). Further, this component also may be controlled by specific profiles and options. In a representative embodiment, this mechanism is button that reads "Wi-Fi SMS."

2. SMS Mailbox: this component typically includes a mechanism to compose, receive, and send SMS messages. It also provides notifications for sent and received messages.

3. Gateway messaging: this component includes messages sent between the client and the gateway to indicate user session state as well as send and receive the SMS data over the IP connection.

One of ordinary skill in the art will appreciate that the present invention provides numerous advantages. The inventive service provides unique value to the subscriber as well as to the service provider. Subscribers benefit because they can maintain their presence and application profile regardless of the network and device they connect from. For instance, the user may select SMS over IP because he or she is on a voice call and wants to continue messaging from the laptop. Other scenarios where the subscriber may want to use the laptop for SMS is when he or she is already working at the laptop or if phone SMS is discouraged. Service providers also benefit from such a service. First, there is an increase in overall SMS usage because users now use SMS even when they are connected over non-GSM/GPRS networks. This directly translates into increased revenues in the already large SMS market. Second, there is also a potential for increased SMS usage due to the easier interface from a laptop. Third, service providers get to retain control over the subscriber even when connected over a different network.

Although an illustrative embodiment involves SMS Forwarding over Wi-Fi, this is not a limitation, as the techniques of the present invention can also be used to forward SMS and/or MMS messages to any IP-based network, such as Wi-Max, Ethernet connections, or the like.

Although not illustrated in detail, one of ordinary skill will also appreciate that the gateway enables access to advanced IMS services over WLAN by interfacing with existing application servers. This may be accomplished over standard interfaces, such as SIP and Parlay. These services include extension of IMS services into the WLAN network, as well as creation of WLAN specific applications by third party application developers, e.g., by using state information exported by the gateway. The SMS Forwarding functionality of the present invention may be implemented as one such WLAN specific application.

Synchronization of the user's SMS address book and message box across devices may be done using SIM backup software (e.g. simbit), as SMS information is stored in the SIM. When the user connects over Wi-Fi, the Wi-Fi connection can be used to synchronize the SMS at the start and end of the Wi-Fi connection.

Figure 11:
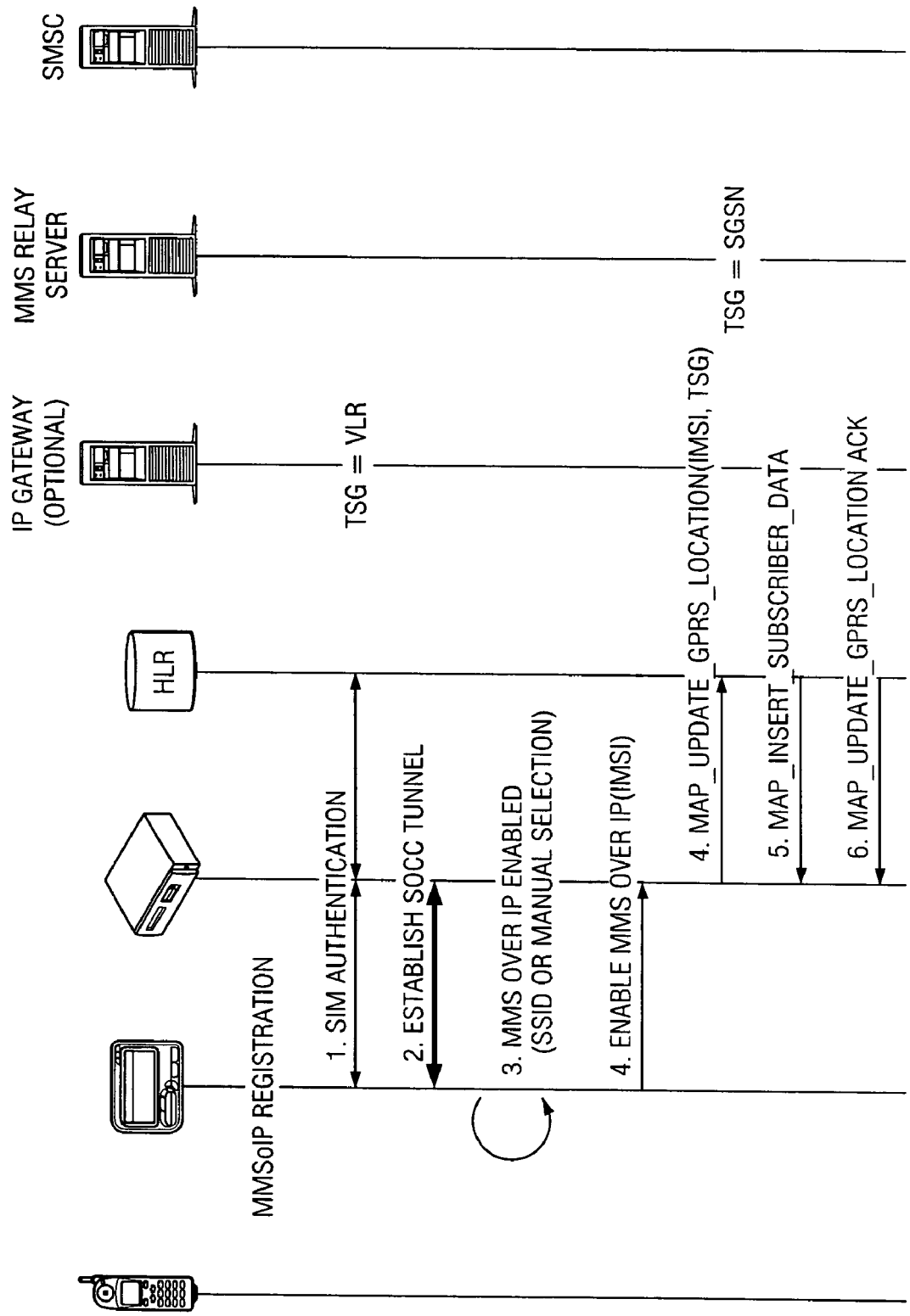
FIG. 11 is a call flow diagram illustrating the MMS registration functionality of FIG. 10 in more detail.
Figure 12:
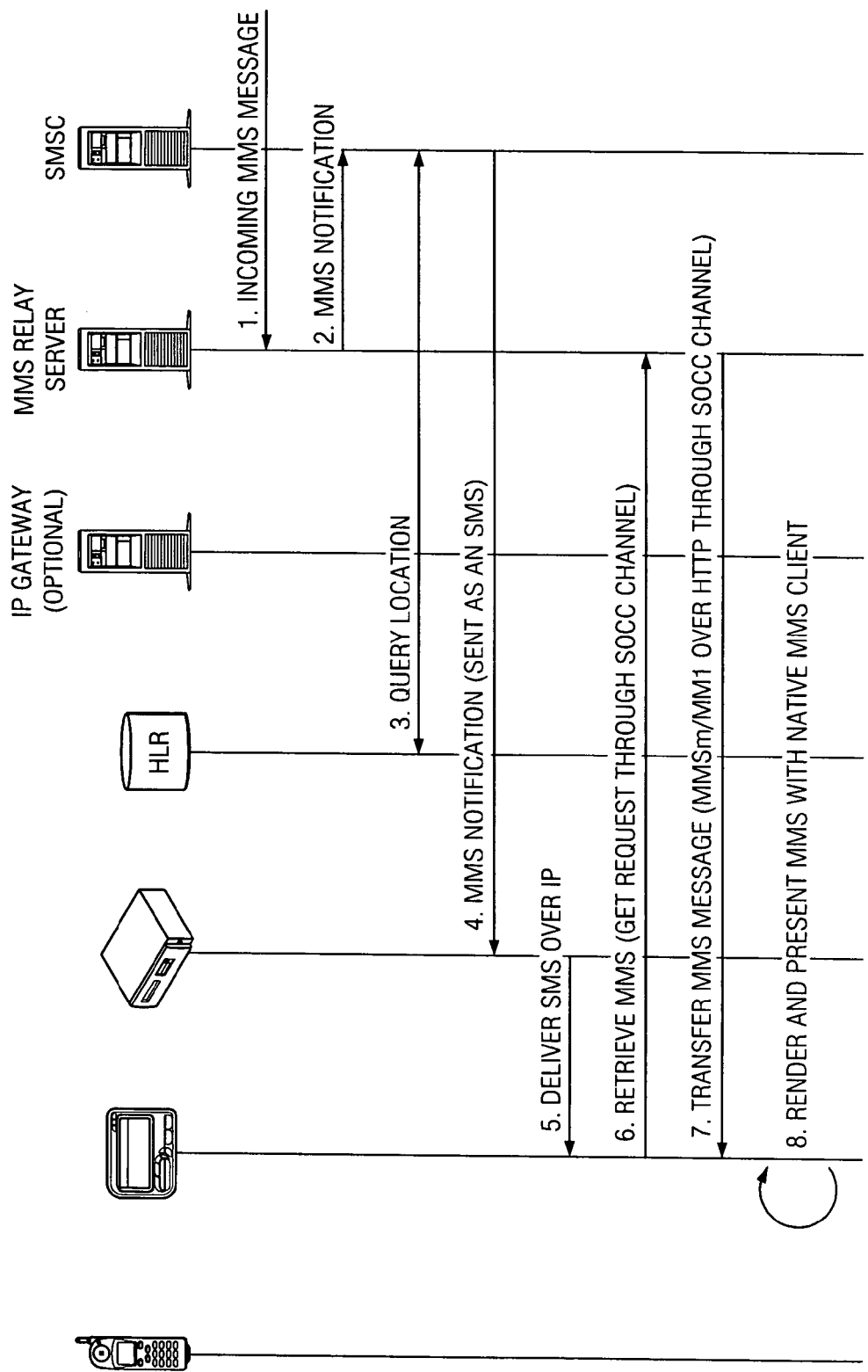
FIG. 12 is a call flow diagram illustrating a first way in which a subscriber may retrieve an MMS from the MMS relay server.
Figure 13:
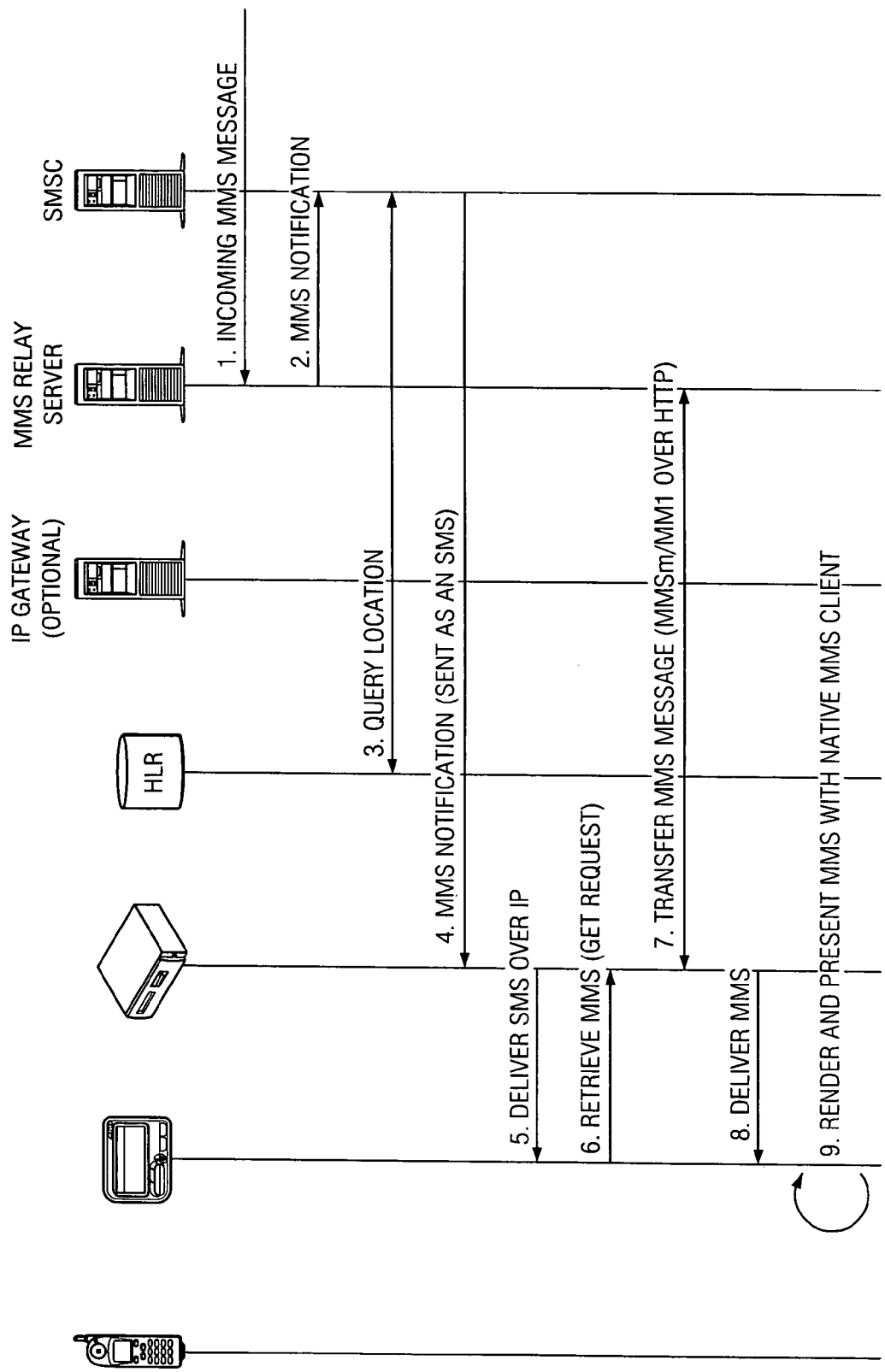
FIG. 13 is a call flow diagram illustrating a second way in which a subscriber may retrieve an MMS from the MMS relay server.

The present invention also implements an MMS forwarding function for received MMS (mobile terminated (MT) MMS), as illustrated in FIG. 10. This operation is sometimes referred to as MMS Forwarding. The converged networking environment includes an MMS relay or server, such as shown. A subscriber initiates the service by making an appropriate selection (e.g., selecting an "MMS over IP" button, which is merely representative) from the client UI (step 1). After receiving the service request, the gateway updates the user's state (step 2) and propagates the state to the HLR (step 3). This registration functionality is similar to that previously described with respect to the SMS embodiment. FIG. 11 is a call flow diagram illustrating the MMS registration functionality. Returning back to FIG. 10, when an incoming MMS is received (step 4), the relay notifies the SMSC (step 5), which then queries the HLR (step 6) to obtain the subscriber's location. The SMS then notifies the gateway (step 7) of the inbound MMS. The gateway, in turn, notifies the subscriber of the MMS, preferably by sending an SMS that includes the notification (step 8). The subscriber then issues a request to retrieve the MMS (step 9). MMS retrieval preferably occurs in one of two alternate ways. FIG. 12 is a call flow diagram illustrating the subscriber retrieving the MMS directly from the MMS relay using HTTP. FIG. 13 is a call flow diagram illustrating the subscriber retrieving the MMS indirectly, i.e., through the gateway, using SIP.

Figure 14:
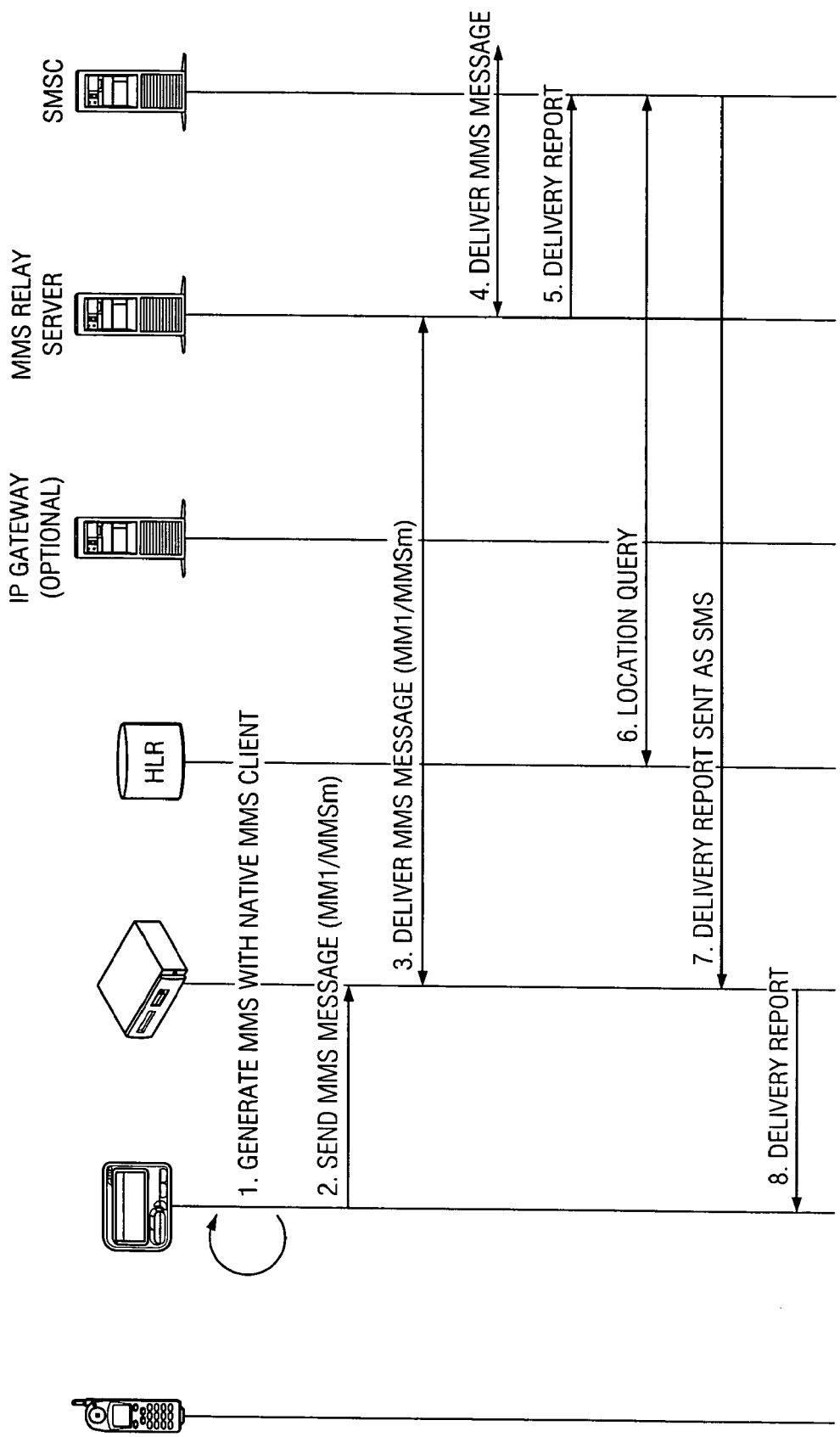
FIG. 14 is a call flow diagram illustrating a preferred call flow for MO MMS using SIP according to the present invention.

FIG. 14 illustrates a preferred call flow for MMS originating from the subscriber (mobile originated (MO) MMS).

While the above describes a particular order of operations performed by a given embodiment of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium including, without limitation, any type of disk including optical disks, CD-ROMs, and magnetic-optical disks, read-only memory (ROM), random access memory (RAM), magnetic or optical cards, or any type of media suitable for storing electronic instructions.

While given components of the system have been described separately, one of ordinary skill also will appreciate that some of the functions may be combined or shared in given instructions, program sequences, code portions, and the like.

Finally, while the above text describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Having described our invention, what we now claim is as follows

GLOSSARY

The following is a glossary of some of the terms used in this written description or used in the accompanying drawings.

SMS refers to Short Message Service, a text message service that enables short messages (e.g., generally no more than 140-160 characters in length) to be sent and transmitted from a mobile device;

MMS refers to Multimedia Message Service, which allows for non-real-time transmission of various kinds of multimedia contents like images, audio, video clips, and the like over wireless networks.

GPRS refers to the General Packet Radio Service, which is a data technology for GSM networks;

MSISDN means mobile subscriber ISDN number, which is the number used to call a mobile subscriber;

SIP refers to the Session Initiation Protocol (SIP), which is a signaling protocol for Internet conferencing, telephony, presence, events notification and instant messaging;

HLR refers to the Home Location Register, a database to which a subscriber's identity is assigned for record and billing purposes;

PSTN refers to the Public Switched Telephone Network;

IMS refers to an Internet Protocol (IP) Multimedia Subsystem, which provides signaling to control real time multimedia services for a packet domain in Universal Mobile Telecommunications System (UMTS) and CDMA networks and allows for smooth integration of new IP-based services. IMS defines a set of components: a Call Session Control Function (CSCF)—which acts as Proxy CSCF (P-CSCF) in a visited network, a Serving CSCF (S-CSCF) in a home network or Interrogating CSCF (I-CSCF) in a home network—to route and control session establishment; a Media Gateway Control Function (MGCF), which controls a Media Gateway and performs protocol conversion between ISUP and SIP; a Media Gateway (MGW), which interacts with MGCF for resource control, a Multimedia Resource Function (MRF), which controls media stream resources; a Breakout Gateway Control Function (BGCF), which selects the network in which PSTN breakout is to occur; and Application Servers, (AS), which offers value added services;

IMSI refers to an International Mobile Subscriber Identity, which is a number that uniquely identifying a GSM subscriber. The number typically contains two parts, a first part that identifies the GSM network operator with whom the subscriber has an account. The second part of the number is allocated by the network operator to identify uniquely the subscriber. IMSI=MCC+MNC+MSIN (HLR+SN).

RADIUS is an IETF-defined client/server protocol and software that enables remote access servers to communicate with a central server to authenticate dial-in users and authorize their access to the requested system or service;

WLAN refers to a wireless local area network, typically based on IEEE 802.11 technology.

GGSN refers to a Gateway GPRS Support Node, which is a node in a GPRS infrastructure that provides a router for delivering data services on a wireless network;

SGSN refers to a Serving GPRS Support Node, which is a node in a GPRS infrastructure that is responsible for the delivery of data packets from and to the mobile stations within its service area;

AAA refers to systems, devices, hardware and/or software that provide authentication, authorization and accounting functions;

OSA refers to Open Service Access, which is a standardized interface used by an application to access service capability features; and CAMEL refers to Customized Application for Mobile Network Enhanced Logic;

PLMN refers to a Public Land Mobile Network;

MSC refers to a Mobile Switching Center, which is typically an interface between a base station system and a switching subsystem of a mobile phone network;

VLR refers to a Visitor Location Register, a local database function that maintains temporary records associated with individual subscribers.

SMSC is a network element in a mobile telephone network that delivers SMS messages; the machine(s) within a wireless service provider's network that provides the routing of all SMS or text messages. Like an email server, the SMSC handles large volumes of messages sent between two mobile phones or a mobile phone and a software application. An SMS internetworking MSC (SMS-IWMSC) is an MSC capable of receiving a short message from the mobile network and submitting it to a given SMSC.

Having described my invention, what I now claim is as follows:

1. A method of communicating a data message within a converged networking operating environment wherein a gateway is deployed in a service provider's telecommunications network and client software is embedded in a subscriber mobile device that is operable within both the telecommunications network and a wireless local area network to which the subscriber mobile device is connectable, the service provider's telecommunications network having a set of one or more network elements that route data messages, and a database that, in use during the communicating method, consists of a first address field for storing MSC/VLR voice presence and location information, and a second address field for storing GPRS data presence and location information, and wherein a connection is established between the client software and the gateway, the method comprising:

updating data message routing information in the database by overloading the second address field in the database with information sufficient to identify the gateway as a location of the subscriber mobile device when the subscriber mobile device is connected to the wireless local area network while leaving the first address field unchanged so that voice signaling remains unaffected;

communicating data messages to and from the subscriber mobile device by:

(a) upon receipt at a first network element of a first data message intended for the subscriber: (i) querying the database for the subscriber's location, (ii) returning to the first network element location information associated with the gateway, (iii) forwarding the first data message from the first network element to the gateway, and (iv) forwarding, over the connection, the first data message from the gateway to the client device;

(b) upon generation of a second data message originated by the subscriber: (i) receiving at the gateway the second data message; and (ii) forwarding the second data message from the gateway to second network element for subsequent delivery over the service provider's telecommunications network; and upon a given occurrence, removing the data message routing information from the database to de-identify the gateway as location of the subscriber mobile device;

wherein the data message is one of: an SMS and an MMS.

\* \* \* \* \*